Dec. 5, 1961 — C. R. CANALIZO — 3,011,511
AIR OR GAS LIFT VALVES
Filed May 15, 1957 — 2 Sheets-Sheet 1
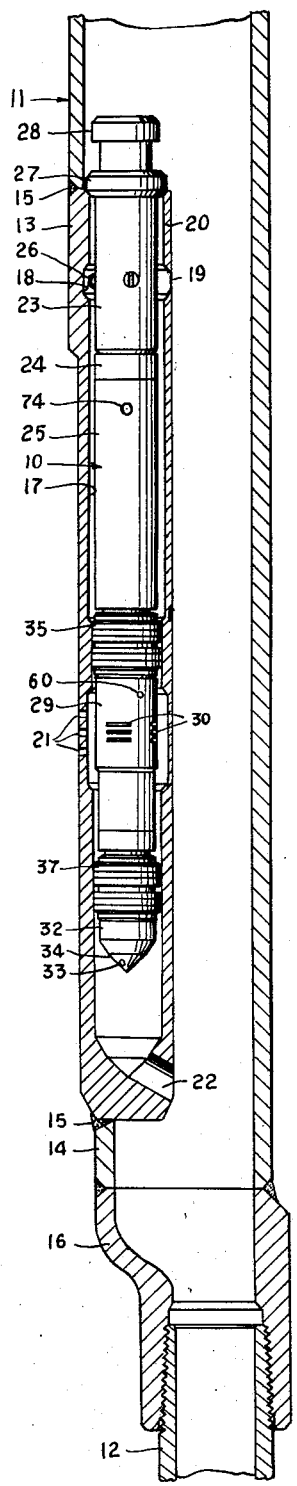
Fig. 1
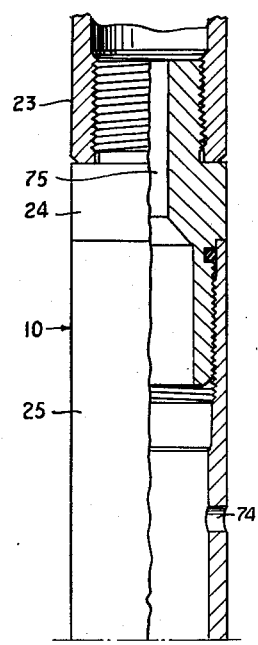
Fig. 2
Fig. 3
Fig. 2-a
INVENTOR
Carlos R. Canalizo
BY
ATTORNEY Dec. 5, 1961 C. R. CANALIZO 3,011,511
AIR OR GAS LIFT VALVES
Filed May 15, 1957 2 Sheets-Sheet 2

INVENTOR
Carlos R. Canalizo
BY
ATTORNEY

United States Patent Office 3,011,511
Patented Dec. 5, 1961

3,011,511
AIR OR GAS LIFT VALVES
Carlos R. Canalizo, Dallas, Tex., assignor to Otis Engineering Corporation, Dallas, Tex., a corporation of Texas
Filed May 15, 1957, Ser. No. 659,331
15 Claims. (Cl. 137—155)

This invention relates to air or gas lift valves and more particularly to fluid operated air or gas lift valves for use in oil wells and the like for controlling the admission of gas or air into a column of fluid in the well to lift said column and aid in flowing the fluid from the well.

In conventional gas lift systems the well equipment includes a string of relatively small pipe called the "tubing" which is inserted inside a larger diameter pipe called the "casing." Gas or air is introduced under controlled pressures or volumes into the annular space between the tubing and the casing and is injected through suitable gas lift valves located at spaced points along the tubing into a column of fluid or liquid, such as oil inside the tubing in order to lift the liquid to the surface. The "fluid" or "liquid" in the well may be oil or other liquids, including water, which may have solids or gases entrained or dissolved therein.

The gas lift valves may be permanently mounted as an integral part of the tubing string, or they may be removably installed in specially prepared landing nipples in which suitable gas inlet ports are provided. Alternatively, the valves may be fixedly or removably positioned in the main bore through the tubing, or the valves may be removably mounted exteriorly of the tubing.

Fluid operated gas lift valves are actuated to open in response to a pre-determined hydrostatic pressure exerted by fluid within the tubing to permit gas to enter the tubing from the casing surrounding said tubing and lift the fluid within the tubing to the surface. Flowing the fluid from the tubing after it has been lifted to the surface decreases the hydrostatic pressure within the tubing and thereby allows the valve to close, thus preventing further entrance of lifting gas.

It is thus an object of this invention to provide a new and improved fluid operated gas lift valve.

A further object is to provide a gas lift valve of the character described wherein the entrance ports through which the lifting gas passes are provided with resilient sealing means for controlling flow through said ports, which sealing means is actuated solely by the pressures of the lifting gas and of the fluids being lifted.

Another object is to provide a gas lift valve of the type described provided with a check valve having a resilient closing means which is relatively free from erosion or corrosion effects, said check valve providing a bubble-tight means preventing the reverse flow of liquids or gas from the tubing to the casing.

Another object of the invention is to provide a fluid operated gas lift valve having a resilient sealing means which is resistant to wear and corrosion and which is capable of being deformed to compensate for any such wear as may occur and to provide an effective bubble-tight seal after long periods of use.

An important object of the invention is to provide a fluid operated gas lift valve of the character described wherein the area of the entrance ports sealed by the resilient sealing means has no bearing on the influence exerted by the pressure of the lifting gas on the operation of the valve, whereby the area of said entrance ports may be made relatively large, thereby providing an ample supply of gas to lift large amounts of oil or water quickly and efficiently.

Yet another object is to provide a fluid operated gas lift valve of the character described wherein the valve opens and closes in response to the height of the liquid column to be lifted whereby said valve opens only when a certain quantity of liquid is available to be lifted and closes when said liquid has been lifted, thereby reducing the quantity of gas necessary to lift said liquid, preventing undesirable gas loss or blow-off and providing a low gas-lifted fluid ratio.

A further object is to provide a fluid operated gas lift valve of the character described wherein the pressure of the lifting gas is exerted at all times on the outer surface of the resilient sealing means, and wherein the pressure of the lifting gas and the hydrostatic pressure of the fluid to be lifted are alternately exerted on the inner surface of said resilient sealing means to alternately close and open the entry ports controlled by said resilient sealing means.

A still further object of the invention is to provide a fluid operated gas lift valve of the character described wherein a pilot plunger is employed to close off admission of lifting fluid or gas pressure and admit only the hydrostatic pressure of the fluid to be lifted to the inner surface of the resilient sealing means when the fluid column to be lifted rises to a certain predetermined height in the tubing whereby the lifting gas pressure acting exteriorly on said resilient sealing means deforms said sealing means to open the inlet ports to admit gas to lift said fluid; said plunger also functioning to admit only the pressure of the lifting gas to the inner surface of said resilient sealing means when the fluid has been lifted and the level of the remaining fluid falls below a predetermined height in the tubing whereby said resilient sealing means returns to position to close said inlet ports to shut off the lifting gas.

A still further object is to provide a gas lift valve of the type described wherein said valve opens and closes quickly and positively without any wire-drawing effects.

Additional objects and advantages of the invention will be readily apparent from the reading of the following description of devices constructed in accordance with the invention, and reference to the accompanying drawings thereof, wherein:

FIGURE 1 is a view, partly in section and partly in elevation, showing one form of the gas lift valve in position in a landing nipple in a tubing string;

FIGURES 2 and 2a, taken together, show an enlarged view, partly in section and partly in elevation, of the gas lift valve of FIGURE 1, the control sleeve of said valve being shown in closed position;

FIGURE 3 is an isometric view of the retainer for the lower end of the control sleeve and for the check valve element of the valve;

Figures 4, 5, 6, 7:
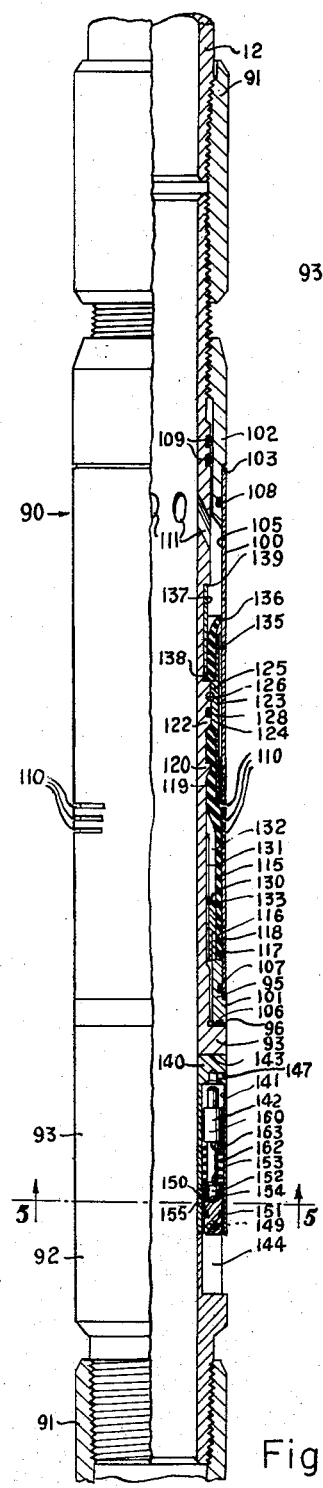
FIGURE 4 is a view, partly in section and partly in elevation, of a modified form of gas lift valve showing the same permanently installed as an integral part of a tubing string.
FIGURE 5 is an enlarged cross-sectional view taken on the line 5—5 of FIGURE 4.
FIGURE 6 is a longitudinal sectional view, taken on the line 6—6 of FIGURE 5, and showing the control plunger of the device; and, FIGURE 7 is a cross-sectional view, taken on the line 7—7 of FIGURE 5.

Referring now particularly to FIGURES 1 through 3 of the drawings, a fluid operated gas lift valve 10 is shown to be removably installed in a landing nipple 11 of a tubing string 12.

The landing nipple shown is of a character generally referred to as the "offset" type and includes a landing section or pocket 13 which is welded into an opening in the wall of a housing 14 by means of the welds 15 and is laterally offset from the axis of the housing whereby a flow passage is provided through said housing past said pocket of a size approximating that of the bore of the tubing string. An eccentric fitting 16 is welded to the lower end of the housing and is connectable to the tubing section below the housing, the eccentric bore of said fitting being aligned with the passage through the housing past the pocket. A similar eccentric fitting (not shown) is provided at the upper end of the housing and in alignment with the fitting 16 whereby a continuous unobstructed and uninterrupted passage is provided through the tubing and the housing.

The landing section or pocket 13 has a longitudinal bore 17 opening to the upper end of said pocket, and an internal annular locking groove or recess 18 is formed in the bore wall near the upper end of the pocket for receiving the locking dog of a well device secured in said pocket as will be more fully hereinafter described.

A plurality of ports 21 through the exterior wall of the landing section at a point spaced below the locking recess but above the lower end of said landing section provide a fluid passage between the exterior of the landing nipple and the interior of the pocket, and a discharge port 22 at the lower end of the pocket permits fluid flow therethrough between the interior of the lower end of the pocket and the interior of the tubing string.

The gas lift valve 10 is provided with a locking mandrel 23 which is threaded onto a screw threaded pin at the upper end of an adaptor plug 24 which is threaded into and closes the upper end of an elongate tubular chamber member or tube 25 of the gas lift valve. The locking mandrel includes an expansible and retractible latch means 26 of a character to engage in the locking recess of the pocket. An external annular flange 27 near the upper end of the locking mandrel is engageable with the upper end of the pocket to limit downward movement of the valve in the pocket, and a fishing neck or gripping head 28 at the upper end of the locking mandrel is engageable by a suitable running or retrieving tool (not shown) for inserting the valve into or removing it from the pocket.

An elongate tubular valve body 29 having a bore 29a therethrough is threaded into the lower end of the chamber 25 and is provided with a plurality of gas entry ports or slots 30 through its wall. A tubular lower sub or packing mandrel 31 is threaded into the lower end of the body, and a guide and flow cap 32 provided with a plurality of longitudinal flow ports 33 therethrough is threaded onto the lower end of the sub. The lower end of the cap is downwardly and inwardly beveled or tapered to provide a guide nose whereby the valve may readily be inserted into the pocket.

An upper packing section 35, shown to be made up of a plurality of sealing rings of the V type, is disposed on the outer surface of the body 29 and is retained thereon above the ports 30 between an upwardly facing annular shoulder 36 on said body and the lower end of the chamber 25. A lower packing section 37, also shown to be made up of a plurality of sealing rings of the V type, is disposed on the lower portion of the lower sub or packing mandrel 31 and is retained thereon between a downwardly facing annular shoulder 38 on said sub and the upper end of the flow cap. The packing sections 35 and 37 seal between the valve and the bore wall of the landing section or pocket for directing fluid flow from the ports 21 of the landing section or pocket to the lateral flow ports or slots 30 of the gas lift valve.

A valve mandrel 39 having a longitudinal bore 40 extending downwardly thereinto from its upper end has mounted on its lower end a flexible, resilient tubular control sleeve or closure member 41 having a closed lower end and constructed of a material such as rubber, neoprene or the like. The sleeve has a slightly tapered frusto-conical section 41a between its closed lower hemispherical end and the tubular upper part. The control sleeve is held in position on the lower end of the valve mandrel by an internal annular flange 42 at the upper end of said sleeve which resiliently engages over an upwardly facing external annular shoulder 43 on the valve mandrel.

The valve mandrel is inserted upwardly through the lower end of the bore of the valve body, the upper end of said mandrel projecting above the upper end of the body. The valve mandrel is held in position in the body by the engagement of an upwardly facing annular shoulder 44 on the reduced upper portion of the mandrel with a downwardly facing internal annular shoulder 45 in the bore of the body and by a nut 46 and a lock nut 47 threaded onto the projecting upper end of the mandrel and engaging the upper end of the body. An O-ring seal means 48 on the mandrel provides a seal between said mandrel and the wall of the bore of the body.

A control piston or plunger 49 is disposed in the longitudinal bore of the valve mandrel and is retained therein by a tubular retainer 50 threaded into the upper end of said bore. An O-ring seal means 50a on the retainer seals between said retainer and the wall of the bore of the mandrel. A helical coiled spring 51 is confined on the upper end of the plunger between the upper end of an external annular flange 52 on the plunger and the lower end of the retainer to bias said plunger downwardly toward the lower end of the longitudinal bore in the mandrel.

The lower extremity of the bore 40 in the mandrel is reduced at 53, and an upwardly facing beveled lower annular seat 54 is provided at the point of reduction of said bore. The lower end 55 of the control plunger is also beveled and is adapted to contact the seat to close off fluid flow therethrough.

A downwardly facing beveled upper annular seat 56 is similarly formed at the lower end of the bore of the tubular retainer 50, and the beveled upper end 57 of the plunger sealingly engages said seat when said plunger is moved upwardly into contact therewith to close off flow through said retainer. The length of the plunger is such that it may quickly move from an upper position contacting the upper seat downwardly through a relatively small distance to contact the lower seat, or upwardly from engagement with the lower seat to contact the upper seat. Manifestly, when the plunger is in contact with one seat, the other seat is open.

It will be noted that the flange 52 of the control plunger is of a diameter approaching the diameter of the bore of the mandrel, and that the seating surfaces 56 and 54 which the plunger sealingly engages when it moves to its upper or lower limit of travel, respectively, are substantially smaller than the flange of the plunger. A sufficient amount of clearance is however provided between the flange 52 of the plunger and the bore wall of the mandrel so that fluids may flow therebetween. It will further be noted that the spring 51 normally moves the plunger downwardly into engagement with the lower seat. The function and operation of the control plunger will be more fully hereinafter explained.

A lateral port 58 extends inwardly from an annular groove or relief 59 in the outer surface of the mandrel into the lower end of the reduced portion 53 of the bore 40 below the lower seat 54, and a lateral port 60 through the wall of the valve body opens into the bore of the body at a point at which it communicates with the groove 59 in the mandrel. It is noteworthy that the port 60 is located between the upper and lower packing sections 35 and 37 and that the groove 59 and the ports 58 and 60 communicating therewith are disposed between the O-ring seal 48 and the upper end of the control sleeve 41. A path for fluid flow is thus provided through the port 60 in the body, the annular groove 59, and the port 58 into the lower end of the reduced portion 53 of the mandrel bore below the lower seat.

A longitudinal flow passage 61 laterally offset from the axis of the mandrel opens at its upper end into the bore 40 of the mandrel at a point spaced laterally outside the lower seat 54 and extends downwardly into the lower portion of the valve mandrel and is intersected by a plurality of lateral passages 62 which extend inwardly from reliefs 63 in the outer surface of the lower end portion of the mandrel. A passage is thus provided from the bore of the mandrel above the lower seat through the lower part of the mandrel into the space 64 inside the control sleeve 41 surrounding the lower part of said mandrel, said space being provided by the reliefs in the outer surface of the mandrel.

The bore of the lower part of the valve body including the portion having the slots 30 therein is enlarged at 65 to accommodate the control sleeve. The control sleeve is of such free size as to normally resiliently engage the inner wall surface of the enlarged part of the bore of the body surrounding the upper of the slots 30, but the tapered part 41a of the sleeve is spaced slightly from the wall surface in the vicinity of the lowermost of the slots 30 to normally permit flow through said lowermost slots. When the sleeve is moved laterally inwardly from the body wall, all of the ports 30 are uncovered and fluids may flow into the valve body through said ports and thence downwardly through the flow slots of a retainer sleeve or spider 66.

The sleeve retainer or spider 66 has a concave upper surface 67 approximating a hemisphere in shape which engages and supports the lower convex hemispherical end of the control sleeve. The spider is in turn supported by the engagement of an external annular downwardly facing shoulder 68 thereon with the upper end of the lower sub. The lower end of the spider is provided with a cup-shaped or concave opening 69 therein and a cup-shaped flexible resilient check valve element 70 made of a flexible, resilient material such as rubber, neoprene, or the like, is retained in said opening by a screw 71 threaded upwardly through said valve element into the spider. The check valve element is provided with an outwardly and downwardly inclined lip 72 which at its lower periphery normally resiliently engages the bore wall of the lower sub.

A plurality of circumferentially spaced longitudinal flow slots 73 in the outer surface of the spider provide fluid flow passages past said spider. The construction of the check valve element is such that fluids flowing downwardly through the slots in the spider cause the lip of the check valve element to deflect inwardly, thus permitting flow downwardly through the flow slots and past the check valve. However, engagement of the lip of the element with the bore wall of the lower sub prevents upward flow past the check valve.

It is noteworthy that the tapered portion 41a of the sleeve, when in an undeformed position, is spaced slightly from the slotted upper surface 67 of the spider. It is also noteworthy that the lower portion of the mandrel deforms the sleeve outwardly into contact with the upper surface of the spider except at the points where the reliefs 63 are provided. The reliefs 63 are aligned with the ports 30 in the body so that, when the sleeve is deflected inwardly into said reliefs, the ports 30 are uncovered.

A lateral port 74 is formed in the wall of the chamber tube 25, and a longitudinal bore 75 may be provided through the adapter plug 24 at the upper end of said chamber. The provision of these openings allows the fluids in the housing pocket above the upper packing section 35 to enter the chamber. Usually, the locking groove 18 in the upper end of the wall of the pocket is of such depth that it cuts an opening 19 through the thinner inner wall 20 of the pocket which opening permits fluid communication between the upper part of the pocket and the interior of the landing nipple. Thus, fluids in the landing nipple may flow through the opening 19 to the port 74 in the chamber tube.

In use, the gas lift valve is lowered through the tubing string and inserted in the pocket 13 of the landing nipple by means of a running tool (not shown) which engages the gripping head 28 of the locking mandrel, the running tool being attached to a set of flexible line operated tools. A suitable positioning or deflecting tool is included in the set of flexible line operated tools and is manipulated in a manner well known in the art to direct the valve laterally into the pocket.

Downward movement of the valve in the pocket is limited by the engagement of the annular flange 27 of the locking mandrel with the upper end of the pocket. The latch means 26 enters the locking recess of the pocket to hold the valve in position, whereupon the running tool is detached from the valve and may be removed from the well.

The upper and lower packing sections 35 and 37 of the valve sealingly engage the wall of the bore of the pocket on either side of the ports 21 of the landing nipple whereby gas or air under pressure (hereinafter generally referred to as "power gas" or "gas") introduced into the space outside the tubing string 12 and within the surrounding casing (not shown) will enter through said ports and be directed through the slots 30 into the valve to lift the liquids which enter the tubing string from below.

When the gas lift valve is initially installed in the landing nipple the control plunger or piston 49 is yieldably held against the lower seat 54 in the body of the valve by the spring 51. If the fluid or liquid level within the tubing string under the natural formation pressure of the well rises to a point above the level of the landing nipple, such liquid enters the pocket through the opening 21 therein and enters the chamber 25 of the valve through the port 74. Additionally, the liquid may enter the chamber through the bore 75 in the adapter sub 24 through the bore of the locking mandrel 23. Manifestly, the landing nipple 11 is installed in the tubing string at a position such that the liquid to be produced by the well will rise naturally to a level above said nipple. Further, a packer (not shown) is preferably employed to seal between the tubing and the casing at a point below the level of the landing nipple whereby the fluids to be produced by the well are directed only into the tubing and whereby gas introduced into the casing is confined to the space within said casing above said packer.

The liquid flows from the chamber 25 downwardly through the tubular retainer 50 and into the valve mandrel past the upper seat 56 (the control plunger being in its lower position) and thence through the annular space between the bore wall of said mandrel and the flange 52 of the control plunger. The liquid then enters the space 64 between the tubular sleeve 41 and the lower part of the mandrel through the passages 61 and 62. The pressure exerted by the head of liquid in the tubing string is thus exerted on the interior of the tubular sleeve to maintain said sleeve in a position to close off flow inwardly through the ports 30 and downwardly through the slots 73 in the spider.

Power gas under a pressure greater than the pressure exerted on the valve by the column or head of liquid in the tubing is admitted to the casing (not shown) surrounding the tubing and the landing nipple and enters the pocket of the landing nipple through the ports 21 and then enters the port 60 and the slots 30 of the valve body. The power gas, exerting a greater pressure force than the tubing liquid within the control sleeve, deforms the sleeve inwardly and flows inwardly and downwardly through the slots 30. From the port 60, the power gas passes through the port 58 into the bore 40 of the mandrel where it acts upwardly on the lower end 55 of the control plunger, moving said plunger upwardly against the pressure exerted by the liquid in the tubing and the force of the spring 51, seating the upper end 57 of said plunger on the upper seat 56. The power gas then passes downwardly through the flow passage 61 and the lateral passages 62 into the interior of the control sleeve 41, where it equalizes the pressure of the power gas acting on the exterior of the sleeve in the ports 30 and permits the control sleeve to return to its normal undeformed position contacting the inner wall of the enlarged lower bore 65 of the valve body adjacent the ports or slots 30.

The area of opening through the ports 30 is less than the area of opening through the slots 73 of the spider. Therefore, due to restricted flow through the ports 30, the pressure in the slots 73 of the spider is reduced below the pressure of the power gas, and the power gas within the sleeve expands the closed lower end of the sleeve firmly into sealing contact with the wall of the bore 65 of the valve body at the upper end of the spider and with the concave upper end of said spider along all edges of the slots 73, thus positively holding the control sleeve in position closing off flow of power gas inwardly through the ports 30 and downwardly through the slots 73.

However, the gas lift valve is initially installed at an elevation in the well at which the natural formation pressure of the well causes the liquid level in the tubing string to rise to such an elevation above the valve that the downward force exerted by the hydrostatic pressure of the column of liquid, acting through the port 74 and the bore of the retainer 50 on the upper end 57 of the control plunger, when coupled with the downward force exerted by the spring 51, produces a resultant downward force greater than the pressure of the power gas acting on the lower end of said control plunger, to move the plunger downwardly away from the upper seat 56. As the plunger moves away from the upper seat, the force exerted by the spring moves the plunger downwardly until the lower end thereof engages the upwardly facing seat 54 closing off the lateral ports 58 and 60 so that power gas cannot enter through said ports into the bore 40 of the mandrel.

With the plunger in its lower position, the power gas previously confined within the control sleeve is permitted to flow back through the passage 61 into the bore 40 of the mandrel where it admixes with hydrostatic liquid pressure from within the tubing, which is less in value than the pressure of the power gas, so that the pressure within the control sleeve is reduced to a value lower than the value of the pressure of the power gas exteriorly of the sleeve. With this condition existing, the pressure of the power gas acting through the ports 30 will deform the control sleeve inwardly into the space 64 and the power gas will be permitted to flow through the ports 30, past the control sleeve and downwardly through the flow slots 73 in the retainer spider and past the lip 72 of the check valve element, deflecting said lip resiliently inwardly from its sealing engagement with the bore wall of the lower sub. The power gas then flows downwardly through the lower packing mandrel and through the flow ports 33 in the flow cap 32, and thence outwardly through the discharge port 22 at the lower end of the pocket into the bore of the landing nipple and the tubing. The power gas aerates and lifts the column of liquid standing in the tubing, ejecting at least part of said liquid from the upper end of the tubing at the surface.

As the column of liquid is lifted and aerated by the power gas, the hydrostatic pressure exerted by said liquid in the chamber of the gas lift valve and acting on the upper end of the control plunger 49 decreases. When the sum of the downward forces on the control plunger exerted by the hydrostatic pressure of the liquid and by the spring 51 is less than the upward force exerted by the power gas on the lower end of said plunger, the plunger moves upwardly under the pressure of the power gas. As the piston moves upwardly, the pressure of the gas acts on the area of the flange 52 of the piston to move said piston rapidly upwardly until the upper end of said piston seats on the upper seat 56, the liquid in the small clearance between the flange of the control plunger and the mandrel preventing rapid upward escape of the power gas. Since the longitudinal travel of the plunger is short, the time interval of movement of the plunger is very short and the force exerted by the spring is relatively unchanged so that the plunger quickly engages the upper seat to close off flow therethrough.

The pressure of the power gas is thus again directed into the control sleeve where it, together with the natural resiliency of the sleeve, causes the said sleeve to move outwardly to its expanded position contacting the inner wall of the body and contacting the upper concave end of the retaining sleeve or spider 66. In such position, the control sleeve closes off the flow of power gas through the valve in the manner already described, and the power gas no longer acts on the fluid in the tubing to lift such fluid from the well.

The liquid or fluid in the tubing now stands at a level less than that at which the gas lift valve opened to admit power gas to the tubing, and the hydrostatic pressure exerted by the liquid on the upper end of the control plunger is thus insufficient to move said plunger downwardly from its upper position.

However, the natural formation pressure of the well causes the liquid level to rise again in the tubing string until such time as the downward force exerted by the hydrostatic pressure of the column of liquid on the upper end 57 of the control plunger, coupled with the downward force exerted by the spring 51, causes the control plunger to move downwardly from the upper seat 56. As the plunger moves away from the upper seat, the pressures of the liquid and of the power gas again equalize around the plunger, permitting the force of the spring 51, acting on the plunger, to move the plunger rapidly downwardly until the lower end of said plunger seats on the lower seat 54. Manifestly, as has already been explained, after the plunger has seated on the lower seat, the power gas previously confined within the control sleeve is permitted to flow back upwardly through the passage 61 into the bore 40 of the mandrel and mix with the liquid therein from the tubing. Thus, the pressure then present in the bore of the control sleeve is the hydrostatic pressure of the liquid in the tubing string, which is less in value by the amount of the force exerted by the spring 51 than the pressure of the power gas.

With the pressure within the control sleeve thus reduced, the pressure of the power gas again moves the control sleeve inwardly from its sealing contact with the wall of the bore of the body adjacent the upper end of the spider and away from the concave upper end of the spider to open the upper end of the slots 73, whereupon the power gas is again admitted into the body of the valve from whence it flows downwardly past the check valve 70 and through the flow ports 33 into the tubing string. The column of liquid in the tubing is thus again lifted and ejected from the well.

As the column of liquid is again lifted, the hydrostatic pressure exerted by said liquid on the control plunger is reduced, whereupon the plunger is again moved upwardly into sealing contact with the upper seat and the pressure of the lifting gas is admitted within the control sleeve to again permit said sleeve to expand to slot-closing position.

Since the flow area of the slots or ports 30 through the wall of the body is smaller than the flow area of the longitudinal flow slots 73 in the spider 66, the pressure within the bore 65 of the body below the slots 30 is less than the gas pressure in the casing while flow is occurring through the slots 30. The check valve element 70 and the flow ports 33 in the flow cap 32 similarly offer less restriction to flow than do the ports 30. Thus the reduction in pressure between the body and the sleeve assists in causing the sleeve to seal with the upper surface of the spider when power gas is admitted to the interior of said sleeve.

When it is desired to remove the gas lift valve from the pocket in the landing nipple, a suitable pulling tool (not shown) is attached to the string or set of flexible line operated tools. The pulling tool is then lowered into the tubing string, and the deflecting tool is manipulated by means of the flexible line in a manner well known in the art to direct the pulling tool into position to grasp the gripping head or fishing neck 28 of the valve. The valve may then be removed from the pocket and from the landing nipple by an upward pull on said valve, the latch means 26 of the locking mandrel being released from its locking position in the recess 18 in said pocket.

It will thus be seen that a gas lift valve has been illustrated and described which is operated by the liquid or fluid to be lifted in the tubing string. It will also be seen that the operation of the valve controls the introduction of power gas into the tubing string to lift the liquid upwardly from the well.

It will further be seen that the valve opens only when the pressure of the liquid in the tubing acting on the control plunger rises to a certain predetermined value and that, where a certain amount of liquid has been ejected from the well by the power gas, the valve closes. Additionally, it will be seen that the cycle of opening when the hydrostatic pressure of the liquid rises above a certain value and closing when the hydrostatic pressure of the liquid falls below a certain value will be repeated as long as the natural pressure of the well is sufficient to raise the liquid in the tubing string to the required level.

It will also be seen that the closing parts of the valve subject to erosion by the rapidly flowing power gas are constructed of resilient materials whereby they are less subject to erosion than a rigid material such as metal. Further, the resiliency of the material permits the closing parts to effect a seal with the valve even though a certain amount of erosion or wear has taken place.

In FIGURES 4 through 7 is shown a modified form of the gas lift valve in which a tubular lift valve 90 is installed as a part of the tubing string 12 by means of couplings 91 threaded to the upper and lower ends of an elongate tubular body or mandrel 92 of the valve. The internal diameter of the valve body is preferably of a diameter approximating that of the tubing string 12 in which the valve is installed.

The outer diameter of the lower part of the valve body is enlarged as at 93 and a supporting bushing 95 is positioned on the body abutting the upwardly facing annular shoulder 96 at the upper end of such enlarged lower portion of the body. The bore or inner diameter of the bushing is slightly greater than the external diameter of the portion of the body over which it is disposed to provide an annular space therebetween which acts as a flow passage, as will be hereinafter more fully explained.

An elongate tubular sleeve or housing member 100 which has a larger bore than the external diameter of the valve mandrel is concentrically mounted exteriorly of the mandrel with its lower end telescoping over the upper portion of the bushing 95 and engaging the upper end of an external annular flange 101 formed on the lower end of said bushing. The upper end of the sleeve or housing member receives the externally reduced lower end of a tubular retaining bushing 102 which is threaded onto the upper end of the valve mandrel. The downwardly facing shoulder 103 at the upper end of the reduced portion of the retaining bushing engages the upper end of the housing sleeve, and as the retaining bushing is threaded downwardly on the mandrel clamps the sleeve between the shoulder 103 and the upper end of the flange 101 of the lower supporting bushing, whereby the sleeve is securely held in concentrically spaced position on the mandrel and the annular space 105 between said sleeve and mandrel forms a flow passage and valve chamber.

O-ring seal means 106 mounted in an annular groove in the lower end of the supporting bushing 95 engages the shoulder 96 on the valve mandrel to seal therebetween, and an O-ring seal means 107 disposed in an external annular groove in the supporting bushing above the flange 101 engages the bore wall of the lower end of the sleeve to prevent fluid flow therebetween. Similarly, an O-ring seal means 108 positioned in an external annular groove in the lower reduced portion of the retaining bushing 102 engages the bore wall of the upper end of the housing sleeve to seal against fluid flow therebetween, and a pair of longitudinally spaced O-ring seal means 109 carried in external annular grooves in the upper portion of the valve mandrel engage the bore of the retaining sleeve and seal off fluid flow therebetween. The chamber or passage 105 is therefore closed at both ends by the several seal means or O-rings.

A plurality of radially spaced sets of longitudinally spaced gas inlet slots 110 are formed in the lower portion of the housing sleeve 100 and provide entry passages from the exterior of the sleeve into the flow passage or valve chamber 105, and a plurality of radially spaced upwardly and inwardly inclined flow ports 111 extend through the wall of the upper portion of the valve mandrel near the upper end of the chamber 105 and provide flow passages from the chamber into the bore of the valve mandrel. Thus, lifting gas may flow from exteriorly of the housing sleeve inwardly through the slots 110, then upwardly through the passage or chamber 105 to the ports 111 and through such ports into the bore of the valve mandrel for lifting fluids present in the bore of said mandrel upwardly through the tubing string.

For controlling flow of lifting gas through the passage or valve chamber 105, an elongate tubular control sleeve or closure member 115, formed of a resilient material such as rubber, synthetic rubber or the like, is positioned in the valve chamber between the inlet slots 110 and the flow ports 111. The lower end of the control sleeve telescopes onto the reduced upper end 116 of the supporting bushing 95, and an external annular flange 117 on the lower end of the control sleeve is engaged by a downwardly facing annular shoulder 118 formed in the bore wall of the housing sleeve, whereby the lower flanged end of the control sleeve is tightly confined and secured between the supporting bushing and the housing sleeve and in fluid sealing engagement therewith.

The upper portion 119 of the control sleeve is reduced in diameter, and engages tightly against the exterior of the valve mandrel at a point above the inlet slots 110. An external annular retainer flange 120 on the mandrel engages in a corresponding internal annular groove formed in the bore wall of the reduced upper portion of the control sleeve for preventing downward movement of the control sleeve on the mandrel, and the upper end of the control sleeve abuts the lower beveled end of an external annular lock flange 122 formed on the mandrel above the retainer flange. An elongate retainer sleeve 123 having a plurality of radially spaced longitudinally extending flow slots 124 in its outer periphery surrounds with its lower end the upper reduced portion of the control sleeve and confines the same in tight sealing engagement with the mandrel. The retainer sleeve has an internal annular lock flange 125 intermediate the ends of its bore, the internal diameter of which fits closely over the external lock flange 122 of the mandrel, and a lock pin 126 is driven through a locking opening extending substantially tangentially through the abutting surfaces of the lock flanges. An O-ring or seal means 128 mounted in an external annular groove formed in the lock flange 122 engages the inner surface of the lock flange 125 to form a fluid tight seal therebetween.

The free configuration of the main or central and lower portion of the control element or sleeve 115 and its resiliency are such that such main portion of said control sleeve normally engages the bore wall of the housing sleeve 100 in the vicinity of the lower of the slots 110, but the upper part of the control sleeve is tapered inwardly to expose the uppermost of the slots 110 and the lower parts of the longitudinal slots 124 in the retainer sleeve.

A flexure control bushing 130 has its reduced lower end telescoping into the upper end of the bore of the lower supporting bushing 95 and is supported thereon for limiting inward deformation or flexing of the control sleeve. The upper portion of the flexure sleeve is reduced in diameter or relieved as at 131 to provide space 132 between the flexure sleeve and the control sleeve adjacent the gas inlet slots 110 to permit the control sleeve to be flexed inwardly away from its normal position engaging the bore wall of the valve housing sleeve 100 adjacent and surrounding the slots. The flexure sleeve is split to facilitate its positioning on the mandrel and has a plurality of longitudinally extending flow grooves 133 in its bore to permit fluid flow upwardly therethrough.

A tubular check valve element 135, formed of rubber, synthetic rubber or the like, having an upwardly flaring flexible lip 136 at its upper end is positioned in the valve chamber or flow passage 105 with its lower end abutting the upper end surfaces of the lock flanges 122 and 125. A flexible split lock ring or cylinder 137 surrounding the mandrel has its lower end engaging an internal annular flange 138 at the lower end of the bore of the check valve element and its upper end abutting a downwardly facing external annular shoulder 139 on the valve mandrel, and this lock cylinder confines the lower portion of the check valve element in sealing position between the mandrel and the bore wall of the upper portion of the retainer sleeve 123. When the main portion of the control sleeve is moved resiliently away from sealing contact with the bore wall of the housing sleeve surrounding the flow slots and into the space 132 between the flexure bushing 130 and said control sleeve, fluids may flow inwardly through the flow slots, upwardly through the longitudinal slots 124 in the retainer sleeve, upwardly past the check valve element by resiliently deflecting the lip 136 away from sealing contact with the housing sleeve, and through the ports 111 into the bore of the mandrel.

A control cylinder 140 having a longitudinal bore 141 is welded or otherwise affixed in a longitudinal slot 143 through an external recess 144 in the wall of the valve mandrel below the enlarged lower end portion of the valve mandrel below the upwardly facing shoulder 96. The bore of the cylinder is reduced as at 145 in its upper portion, and an upper downwardly facing annular seat 146 is formed at the point of reduction of said bore. The reduced upper portion of the bore is closed at its upper end, and a lateral gas inlet port 147 extends outwardly through the exterior wall of the cylinder from said reduced upper portion of the bore above the seat 146 to the exterior of said cylinder.

The open lower end of the cylinder is closed by a removable closing plug 148 which is retained in position therein by set screws 149, and a pair of spaced O-rings or seal means 150 and 151 near the upper and lower ends, respectively, of said plug seal between said plug and the wall of the bore of the cylinder. A reduced bore 152 extends downwardly into the upper end of the closing plug, and a lower upwardly facing annular seat 153 is formed at the upper end of said reduced bore. A lateral port 154 through the wall of the plug intersects the reduced bore 152 at a point between the upper and lower O-rings or seal means 150 and 151, and said lateral port is substantially aligned for fluid communication with a fluid inlet port 155 opening through the wall of the cylinder into the interior of the valve mandrel, the set screws 149 serving to approximately align said ports.

A lateral port 156 is provided through the wall of the upper part of the cylinder at a point slightly below the upper seat 146, and a tubular flow conduit 157 attached to the exterior of the cylinder as by welding or brazing for fluid communication with said intermediate lateral port. The flow conduit extends laterally from the cylinder a short distance and then upwardly to the downwardly facing surface 158 at the upper end of the external recess 144 in the valve mandrel.

A passage 159 extends upwardly from the surface 158 to the inner extremity of the upwardly facing annular shoulder 96 on the mandrel. The upper end of the tubular flow conduit 157 is affixed to the surface 158 as by brazing or welding in such a manner that the conduit is in fluid communication with the passage 159. Thus, a path for fluid flow is provided from the cylinder through the port 156, the conduit 157 and the passage 159 to the lower end of the valve chamber 105 below the flexible control sleeve and thence through the slots 133 in the flexure sleeve to the space 132 between said flexure sleeve and the control sleeve.

A control plunger or piston 142 is slidably positioned in the bore 141 of the control cylinder and is movable a short distance longitudinally therein between the upper seat 146 and the lower seat 153. The ends of the plunger are each beveled correspondingly to the adjacent seat and are adapted to engage said seats to close the same against fluid flow therethrough. The plunger has an external annular flange 160 intermediate its ends having a diameter less than the diameter of the bore of the cylinder, whereby a small clearance is provided between said flange and the wall of the bore of the cylinder and said plunger is freely slidable longitudinally in said cylinder. A spring 162 is disposed around the lower portion of the plunger and engages the upper end of the closing plug and the downwardly facing lower end surface 163 of the flange on said plunger to bias said plunger upwardly toward sealing engagement with the upper seat 146.

The gas lift valve is installed in the tubing string 12 by means of the couplings 91 at a depth at which the natural formation pressure of the well will cause the liquids therein to rise to a point above said valve. A packer (not shown) may be installed in the customary manner below the gas lift valve whereby the formation liquids are directed into the tubing string only.

The operation of this form of the gas lift valve is similar to that of the form already described. That is, when the fluid level in the tubing falls below a certain point in the well, the pressure of the power gas, acting through the gas inlet port on the upper end of the control plunger 142 causes said plunger to be moved downwardly into seating contact with the lower seat 153 whereupon the pressure of said gas is admitted past the upper seat 146, through the lateral port 156, the conduit 157, the passage 159, the annular space between the bushing 95 and the mandrel, and through the slots 133 in the flexure sleeve 130 into the space 132 between said flexure sleeve and the control sleeve 115.

With the power gas admitted to the interior of the control sleeve, said sleeve, because the power gas exerts a pressure greater than does the fluid in the tubing, is expanded into sealing contact with the bore wall of the housing at the lower end of the retainer sleeve and into sealing engagement with the longitudinal flow slots 124, thereby shutting off the flow of gas through the slots 110 into the valve.

When the liquid level within the tubing string builds up to a point at which the hydrostatic pressure force exerted by said liquid on the lower end of the control plunger, plus the upward force exerted by the spring 162 on said plunger, exceeds the downward force exerted thereon by the pressure of the power gas, said plunger is moved upwardly into engagement with the upper seat 146. The pressure within the control sleeve is reduced through the path of fluid communication from said sleeve through the cylinder and thence through the ports 154 and 155 into the bore of the valve mandrel.

As the pressure within the control sleeve is reduced, the sleeve first resumes its free configuration to expose the uppermost of the slots 110 and the lower parts of the longitudinal slots 124. As the pressure in the control sleeve is reduced to that in the tubing, the power gas moves said sleeve resiliently inwardly to open the slots 110, then moves upwardly past the sleeve, through the longitudinal slots 124 in the retainer sleeve 123, past the check valve element 135 and through the ports 111 into the bore of the mandrel to aerate and lift the liquid within the tubing string to the surface.

As the liquid column is lifted, the hydrostatic pressure exerted by said column on the control plunger decreases until the power gas is again able to overcome the upward force of the hydrostatic pressure and the spring 162 on said plunger, whereupon the plunger is again moved downwardly to engagement with the lower seat 153 and the power gas pressure is again admitted to the interior of the control sleeve, whereby said sleeve again closes off flow through the inlet slots.

Thus, it will be seen that a gas lift valve has been shown and described which can be installed as a permanent part of the tubing string of a well and which operates to open and close a port for the admittance of power gas into said tubing string to lift a column of fluid or liquid therein.

It will be seen that the operation of this form of the gas lift valve is the same as the operation of the form first described. That is, the gas lift valve opens only when the liquid level in the tubing string rises to a certain predetermined height above said valve; and that, when a certain amount of liquid has been ejected by the power gas, the valve closes. Further, it will be seen that the valve will continue to complete its opening and closing cycles to lift the liquid in the tubing string as long as the natural formation pressure of the well is sufficient to raise the liquid to the required level within the tubing.

It will particularly be seen that the hydrostatic pressure of the fluid in the tubing, which is to be lifted or flowed upwardly out of the well by the power or lifting gas, acts directly on the flexible resilient control sleeve or closure member of the gas lift valve to effect operation of said valve, and that said flexible resilient control sleeve is operated by the pressures of the fluid and lifting gas acting thereon.

It will also be seen that the check valve element of the gas lift valve prevents reverse flow through the gas lift valve in the event that the pressure of the power gas is decreased or removed. Further, it will be seen that the closure element or control sleeve of the valve and the check valve element are made of a flexible resilient material whereby the closing seals necessary to shut off flow through said valve are not adversely affected by erosion or corrosion of the seating surfaces.

The foregoing description of the invention is explanatory only and changes in the details of the constructions illustrated may be made by those skilled in the art, within the scope of the appended claims, without departing from the spirit of the invention.

What is claimed and desired to be secured by Letters Patent is:

1. A gas lift valve including: a tubular body; a gas inlet passage through said body including port means in said body opening from one region exterior of the body to the interior thereof; a tubular flexible closure member in said body normally disposed in a position in said body with its exterior engaging the body at said port means for closing said port means to flow of fluids therethrough; said closure member being flexible out of port closure engagement with said body to open said port means to flow of fluids therethrough; means closing the ends of said tubular flexible closure member whereby a chamber is formed within said closure member; first conduit means providing a first flow path for gas from said one region exterior of said body to said chamber; second conduit means providing a second flow path for fluids or liquids from a second region exterior of said body to said chamber; and movable control means in said flow paths responsive to the pressure of fluids present in said flow paths from exteriorly and interiorly of said body movable to positions alternately closing one or the other of said first and said second flow paths in response to the pressures exerted thereon by the fluids present in said flow paths to charge the chamber in the closure member with fluid from one or the other of said flow paths for controlling flow through the gas inlet path.

2. A gas lift valve including: a tubular body; port means in said body opening from one region exterior of the body to the interior thereof; a substantially tubular resilient flexible closure member on said body normally disposed in a position in said body engaging said body at said port means for closing said port means to flow of fluids therethrough; said closure means being flexible out of such port means closing engagement with said body to a port opening position to permit fluid flow through said port means; means closing the ends of said flexible closure member whereby a chamber is formed within said closure member; first conduit means providing a first flow path for gas from said one region exterior of said body to said chamber; second conduit means providing a second flow path for fluids or liquids from a second region exterior of said body to said chamber, said conduit means having a common portion intermediate their ends; and control means movable in said common portion of said conduit means between a position closing off flow of gas through said first conduit means and a position closing off flow of fluids or liquids through said second conduit means, said control means being moved in response to the pressure of fluids in said conduit means.

3. A gas lift valve of the character set forth in claim 2 including: resilient means biasing the control valve means toward position closing off said first conduit means.

4. A flow device including: a housing having a bore having an outlet at one end and provided with a lateral port means forming an inlet passage between one region exterior of the housing and its bore; substantially tubular resilient closure means closed at its ends mounted in the housing for controlling flow of fluid through said lateral port means in response to fluid pressure exteriorly of said closure means; conductor means providing a flow passage for gas from said one region exterior of the housing to the interior of said closure means; conductor means providing a flow passage for conducting well fluids from the bore of the housing to the interior of said closure means, said bore communicating with a second region exterior of the housing; valve means carried by said housing in said conductor means responsive to the pressure of the fluids present in said flow passages and movable to positions alternately separately directing fluid pressure from exteriorly of said housing and from interiorly of said housing to said closure means to operate said closure means, whereby said closure means is operable in response to said fluid pressure to control flow through said lateral port.

5. A flow device including: a housing having a bore having an outlet at one end and provided with lateral port means between one region exterior of the housing and its bore providing a gas flow inlet spaced from the outlet of said body; a resilient tubular closure member mounted in said housing and having its exterior positioned normally in engagement with the bore wall of said housing to close said lateral port means; said closure member being flexible out of such port closing position; means closing the ends of said tubular closure member; means carried by said housing providing a fluid control chamber communicating with the interior of said tubular closing member; a first flow passage from said one region exterior of said housing to the control chamber; a second flow passage from the bore of said housing to said control chamber, said bore communicating with a second region exterior of the housing; and control means movable in said control chamber between a position closing off flow through said first passage and a position closing off flow through said second passage; said control means being movable between such positions in response to the fluid pressure of said regions exterior of said housing.

6. A gas lift valve including: a tubular body; port means in said body opening from one region exterior of the body to the interior thereof; a flexible resilient substantially tubular closure member in said body and disposed with its exterior engaging the interior of said tubular body at said port means to close said port means to flow of fluid therethrough; said closure member being flexible out of engagement with said port means closing position; means closing the ends of said closure member whereby a sealed chamber is formed within said closure member; first conduit means providing a first flow path from within said closure member to said one region exterior of said body; second conduit means providing a second flow path from within said closure member to the interior of said body, the interior of said body communicating with a second region exterior of said body; a first seat means in said first conduit means and a second seat means in said second conduit means; a plunger in said conduit means movable from a first position engaging said first seat means to close said first conduit means and open said second conduit means to a second position engaging said second seat means to close said second conduit means and open said first conduit means; and means resiliently biasing said plunger toward said first seat means.

7. A gas lift valve including: a tubular body; port means in said body intermediate the ends of said body and providing a gas inlet opening from one region exterior of said body to the interior thereof; a flexible resilient substantially tubular closure member in said body normally disposed in a position engaging said the interior of said body at port means to close said port means to flow of fluid therethrough; means closing the ends of said closure member whereby a sealed chamber is formed within said closure member; said closure member being movable resiliently and flexibly away from said port means to open said port means; first conduit means providing a first flow path from within said closure member to said one region exterior of said body; second conduit means providing a second flow path from within said closure means to the interior of said body, the interior of said body communicating with a second region exterior of said body; a first seat means in said first conduit means and a second seat means in said second conduit means; a plunger in said conduit means movable from a first position engaging said first seat means to close said first conduit means and open said second conduit means to a second position engaging said second seat means to close said second conduit means and open said first conduit means; means resiliently biasing said plunger from said second seat means toward said first seat means; and check valve means in said body opening to flow inwardly through said port means into the interior of said body but closing to flow from within said body outwardly through said port means.

8. A gas lift valve including: a tubular body; port means in said body intermediate the ends thereof opening from one region exterior of the body to the interior thereof; a flexible resilient tubular closure member on said body disposed to engage the interior of said body at said port means to close said port means to flow of fluids therethrough; said closure member being flexible out of engagement with said body to open said port means; means closing the ends of said flexible closure member whereby a chamber is formed within said closure member; a cylinder carried by said body; first seat means at one end of said cylinder and second seat means at the other end of said cylinder; first conduit means providing a first flow path from said one region exterior of said body to the first seat in said cylinder; second conduit means providing a second flow path from the interior of said body to the second seat in said cylinder, the interior of said body conductor means providing a flow path from said cylinder to said chamber, said conductor means opening into said cylinder intermediate said seat means; control means in said cylinder and movable therein from a first position engaging said first seat means to close off said first conduit means to a second position engaging said second seat means to close off said second conduit means, said control means being moved in response to the pressures of fluids in said conduit means.

9. A gas lift valve including: a tubular body; port means in said body intermediate the ends thereof opening from one region exterior of said body to the interior thereof; a flexible resilient substantially tubular closure member on said body disposed to engage the interior of said tubular body at said port means to close said port means to flow of fluids therethrough; said closure member being flexible out of port means closing engagement with said body to open said port means to fluid flow therethrough; means closing the ends of said flexible closure member whereby a first chamber is formed within said closure member; means forming a flow control chamber in said body; passage means connecting said first chamber and said flow control chamber first conduit means providing a first flow path from said one region exterior of said body to said flow control chamber; second conduit means providing a second flow path from the interior of said body to said flow control chamber, the interior of said body communicating with a second region exterior of said body; said first conduit means and said second conduit means communicating with said flow control chamber at spaced positions; and control valve means in said flow control chamber movable between a first position to close off said first conduit means and a second position to close off said second conduit means; said control valve means being moved in response to the pressures of fluids in said conduit means to one of said first and second positions to permit fluid pressure from one of said conduits to pass through said flow control chamber into said first chamber within said closure member and closing off flow through the other of said conduits through said flow control chamber, whereby flexure of said closure member is controlled in response to the pressure of the fluid directed into said first chamber in said closure member.

10. A flow device including: a housing having a bore having an outlet at one end and provided with lateral port means forming a flow passage between one region exterior of the housing and its bore intermediate the ends of said housing; a resilient tubular closure member mounted in said housing and having its exterior positioned in engagement with the bore wall of said housing at said lateral port means to close said lateral port means, said closure member having one end closed and the other end open; means carried by said housing providing a fluid control chamber communicating with the interior of said closure member through the open end of said closure member; a first flow passage from said one region exterior of said housing to the control chamber; a second flow passage from the bore of said housing to said control chamber, said bore communicating with a second region exterior of said body; and control valve means movable in said chamber between a position closing off flow through said first passage and a position closing off flow through said second passage; said control valve means being movable to such positions in response to the fluid pressures interiorly and exteriorly of said housing, said control valve means when in one position closing off flow through one passage and permitting flow of fluid pressure through said fluid control chamber to the interior of said closure member and when in said position closing off flow through the second passage permitting flow of fluid pressure through the first passage into the interior of said closure member, whereby flexure of said closure member is controlled in response to such fluid pressures.

11. A flow device including: a housing having a bore having an outlet at one end and provided intermediate its ends with lateral port means communicating between one region exterior of the housing and its bore; a resilient tubular closure member mounted in said housing and having its exterior normally positioned in engagement with the bore wall of said housing at said port means to close said lateral port means and being flexible out of such engagement with said housing to permit flow through said port means, said closure member having one end closed and the other end open; means carried by said housing providing a fluid control chamber communicating with the interior of said closure member through the open end of said closure member; a first flow passage from said one region exterior of said housing to the control chamber; a second flow passage from the bore of said housing to said control chamber and entering said chamber at a point spaced from said first flow passage entrance, said bore communicating with a second region exterior of said housing; control valve means movable in said chamber between a first position closing off flow through said first passage into said control chamber and simultaneously opening said second passage for fluid pressure flow through said control chamber to the interior of said closure member, and a second position closing off flow through said second passage into said control chamber and simultaneously opening said first passage for fluid pressure flow through said control chamber to the interior of said closure member; said control valve means being movable to such first and second positions in response to the fluid pressures at said regions exterior of said housing; and means resiliently biasing said control valve means to said position closing said first passage.

12. A flow device including: a housing having a bore having an outlet at one end and provided intermediate its ends with lateral port means communicating between one region exterior of the housing and its bore; a resilient tubular closure member mounted in said housing and having its exterior when in normal unflexed condition positioned to engage the bore wall of said housing at said lateral port means to close said lateral port means, said closure member having one end closed and the other end open; means carried by said housing providing a fluid control chamber and a conduit therefrom communicating with the interior of said closure member through the open end of said closure member; a first flow passage from said one region exterior of said housing to the interior of said control chamber; a second flow passage from the bore of said housing to the interior of said control chamber at a point spaced from said first flow passage, said bore communicating with a second region exterior of said housing control valve means movable in said chamber between a first position closing off flow through said first passage into said control chamber and simultaneously opening said second passage for passage of fluid pressure through said control chamber to the interior of said closure member, and a second position closing off flow through said second passage into said control member and simultaneously opening said first passage for passage of fluid pressure through said control chamber to the interior of said closure member; said control valve means being movable between such first and second positions in response to the fluid pressures at said regions exterior of said housing; means resiliently biasing said control valve means to said position closing said first passage; and check valve means in said housing disposed between said closure member and the outlet from said housing bore, said check valve means opening to flow from the exterior of said housing through the bore thereof and closing to flow from the outlet from the bore of said housing through said lateral port means to the exterior of said housing.

13. A gas lift valve of the character set forth in claim 12 wherein said check valve means includes a flexible resilient tubular member having a lip sealingly engageable with the housing to control the flow past said check valve.

14. A gas lift valve for use in a cased wellbore having an eduction tubing therein, said gas lift valve including: a tubular body mounted on said eduction tubing, said body having a gas inlet passage therethrough for admitting gas from the casing into the eduction tubing from one region exterior of said body, said passage including gas inlet port means; a tubular flexible closure member in said body normally disposed in a position in said body with its exterior engaging the body at said port means for closing said port means to flow of fluid therethrough, said closure member being flexible out of such engaging position to permit flow of fluid through said gas inlet passage; means closing the ends of said closure member to provide a chamber within said closure member; a first flow path extending from exteriorly of said member to said chamber, said first flow path having communication with the cased well from said one region exterior of the tubing for admitting gas to the chamber in said closure member; a second flow path from the interior of said body to said chamber, said second flow path having communication with the interior of said eduction tubing for admitting fluids from within said tubing to the chamber in said closure member, the interior of said tubing having communication with a second region exterior of said tubing; movable control means in said paths exposed to the pressure of the fluid therein and responsive to such pressure, said control means being movable between a position closing the first flow path and opening the second flow path and a position opening the first flow path and closing the second flow path, said control means being movable to such positions in response to the pressures exerted thereon by the fluids present in said flow paths to charge the chamber in said closure member alternately with the fluid from one or the other of said flow paths for controlling the position of said closure member with respect to said port means to control flow of gas through said gas inlet passage from the cased well exteriorly of the tubing into said tubing for lifting fluids in said tubing.

15. A gas lift valve including: a tubular body; port means in said body opening from one region exterior of the body to the interior thereof; resilient tubular flexible closure means normally disposed in a position in said body at said port means for closing said port means to flow of fluid therethrough; means closing the ends of said flexible closure means whereby a chamber is formed within said body and said closure means; said closure means being flexible out of port closing engagement with said body to a port opening position to permit fluid flow through said port means; and conductor and valve means for separately directing the pressure of fluids from a second region exterior of the body and fluids from said one region exterior of the body to said chamber and into contact with said flexible closure means for moving the same between port opening and closing positions in response to such pressures, said valve means being responsive to said pressures exteriorly and interiorly of the body, said valve means closing said conductor means from said one region to said chamber while said conductor means from said second region to said chamber is open and closing said conductor means from said second region to said chamber while said conductor means from said first region to said chamber is open, whereby the pressure of the fluid from only one of said regions is at any one time directed to said chamber.

References Cited in the file of this patent

UNITED STATES PATENTS

| | | |
|---|---|---|
| 2,280,788 | Boynton | Apr. 28, 1942 |
| 2,391,605 | Walton | Dec. 25, 1945 |
| 2,620,740 | Garrett | Dec. 9, 1952 |
| 2,642,889 | Cummings | June 23, 1953 |

FOREIGN PATENTS

| | | |
|---|---|---|
| 645,056 | Germany | May 20, 1957 |